US010070343B2

(12) United States Patent
Kim et al.

(10) Patent No.: US 10,070,343 B2
(45) Date of Patent: Sep. 4, 2018

(54) MOBILE DEVICE TRAFFIC MANAGEMENT

(71) Applicant: MOBILE IRON, INC., Mountain View, CA (US)

(72) Inventors: Mansu Kim, Cupertino, CA (US); Benjamin Markines, Sunnyvale, CA (US); Suresh Kumar Batchu, Milpitas, CA (US)

(73) Assignee: MOBILE IRON, INC., Mountain View, CA (US)

( * ) Notice: Subject to any disclaimer, the term of this patent is extended or adjusted under 35 U.S.C. 154(b) by 71 days.

(21) Appl. No.: 14/563,952

(22) Filed: Dec. 8, 2014

(65) Prior Publication Data

US 2015/0201322 A1    Jul. 16, 2015

Related U.S. Application Data

(60) Provisional application No. 61/913,027, filed on Dec. 6, 2013.

(51) Int. Cl.
*H04W 28/16* (2009.01)
*H04W 8/12* (2009.01)
*H04W 8/22* (2009.01)
*H04W 8/02* (2009.01)
H04W 28/02 (2009.01)
H04L 12/813 (2013.01)

(52) U.S. Cl.
CPC ............ *H04W 28/16* (2013.01); *H04L 47/20* (2013.01); *H04W 8/02* (2013.01); *H04W 8/12* (2013.01); *H04W 8/22* (2013.01); *H04W 28/0226* (2013.01)

(58) Field of Classification Search
CPC .. H04L 47/20; H04W 28/0226; H04W 28/16; H04W 8/02; H04W 8/12; H04W 8/22
See application file for complete search history.

(56) References Cited

U.S. PATENT DOCUMENTS

| | | |
|---|---|---|
| 8,578,443 B2 | 11/2013 | Narain et al. |
| 2004/0103282 A1 | 5/2004 | Meier et al. |
| 2010/0278122 A1 | 11/2010 | Singh et al. |
| 2011/0143724 A1* | 6/2011 | Zubas ............... H04M 3/53325 455/413 |
| 2011/0268039 A1* | 11/2011 | Wang ..................... H04W 8/12 370/328 |
| 2012/0151044 A1 | 6/2012 | Luna et al. |
| 2013/0103833 A1 | 4/2013 | Ringland et al. |
| 2013/0273910 A1 | 10/2013 | Zinn et al. |
| 2014/0113644 A1* | 4/2014 | Burchardt ............. H04L 5/0032 455/452.1 |
| 2014/0279501 A1* | 9/2014 | Kumar ............... G06Q 20/3224 705/44 |
| 2015/0067165 A1* | 3/2015 | Cha ........................ H04W 76/36 709/225 |

(Continued)

*Primary Examiner* — Frantz Bataille
(74) *Attorney, Agent, or Firm* — Van Pelt, Yi & James LLP

(57) ABSTRACT

Mobile device traffic management is disclosed. Information including a traffic management policy to be applied to data transferred between a mobile device and a node is received from a device management server. The device management server determines the traffic management policy based at least in part on roaming state information received from the mobile device. Data transferred between the mobile device and the node is processed based at least in part on the traffic management policy.

23 Claims, 14 Drawing Sheets

(56) References Cited

U.S. PATENT DOCUMENTS

2015/0223042 A1* 8/2015 Li ................ H04W 4/24
                                                                              455/406
2015/0327110 A1* 11/2015 Jeong ............ H04W 48/20
                                                                              370/338

\* cited by examiner

US 10,070,343 B2

MOBILE DEVICE TRAFFIC MANAGEMENT

CROSS REFERENCE TO OTHER APPLICATIONS

This application claims priority to U.S. Provisional Patent Application No. 61/913,027, entitled ROAMING SENTRY filed Dec. 6, 2013 which is incorporated herein by reference for all purposes.

BACKGROUND OF THE INVENTION

Mobile devices are frequently used in locations where the device's home cellular network does not provide coverage. In this scenario, the mobile device may be roaming. A mobile device may be roaming when, for example, it is connected to a cellular network other than its home cellular network, when it is used in a foreign country, and/or in other situations. Cellular network providers often impose additional charges when a mobile device is roaming, and this can lead to high roaming charges, especially if the device is used in a foreign country. It would be useful if a system could be developed to manage mobile device data usage, especially while a mobile device is roaming.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Mobile device traffic management is disclosed. Information including a traffic management policy to be applied to data transferred between a mobile device and a node is received from a device management server. The device management server determines the traffic management policy based at least in part on roaming state information received from the mobile device. Data transferred between the mobile device and the node is processed based at least in part on the traffic management policy.

Figure 1:
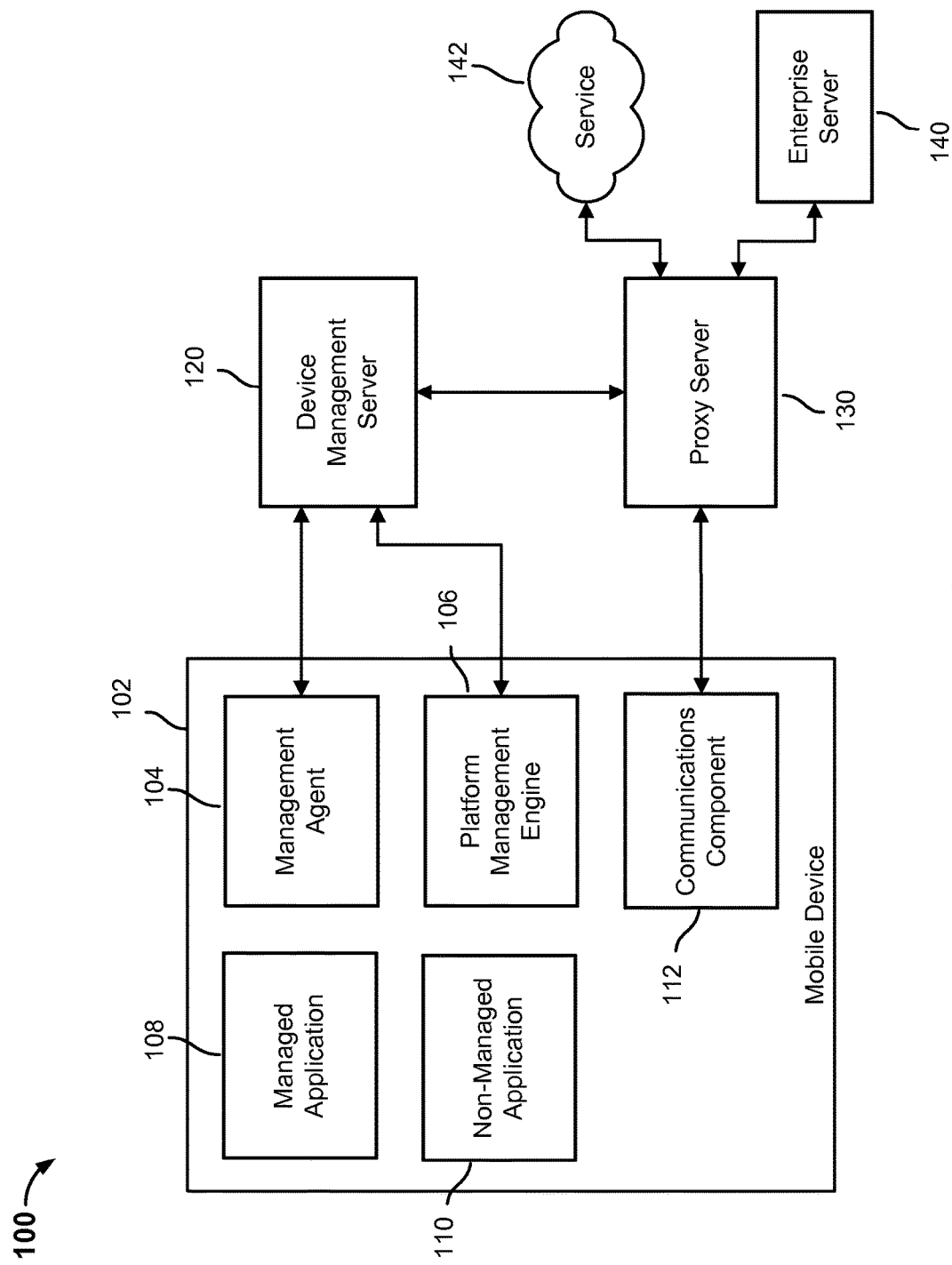
FIG. 1 is a block diagram illustrating embodiments of a system to manage mobile device traffic.

FIG. 1 is a block diagram illustrating embodiments of a system to manage mobile device traffic. In the example shown, a system 100 to manage mobile device traffic includes a mobile device 102, a device management server 120, a proxy server 130, and/or other components. A mobile device 102 may include smartphone, tablet, and/or any other mobile computing device. A mobile device 102 may include a management agent 104, a platform management engine 106, managed application(s) 108, non-managed application(s) 110, a communications component/engine 112, and/or other components. The management agent 104 may include a management agent installed on the device 102 by a mobile device management (MDM) provider. The MDM provider may, for example, include entity that is separate from the mobile device operating system and/or mobile device developer. The MDM provider may be associated with the device management server 120, and the management agent 104 be controlled by and/or perform operations on behalf of the device management server 120. In some cases, the management agent 104 may include device-level management agent functionality and management agent functionality that is integrated with a device management server 120. For example, in mobile devices using the Android operating system, the management agent 104 may include device-level management functionality as well as management functionality that configures the management agent 104 to operate in conjunction with the device management server 120 by, for example, performing actions on behalf of the device management server 120. The device-level management agent functionality may be similar to operations performed by a platform management engine 106. In certain cases, the platform management engine 106 includes a management agent/engine associated with the operating system (OS) of the device 102 (such as iOS). In certain cases, a managed application 108 is managed by the management agent 104 and/or platform management engine 106. Managed applications 108 may include and/or be modified to include a library and/or wrapper. The library may be, for example, compiled into the application, injected into the application, added to the application by wrapping, added as a software development kit (SDK), and/or otherwise added to a managed application 108. The library and/or wrapper may configure the managed application 108 for use in an MDM environment by, for example, allowing the management agent 104 and/or platform management engine 106 to control the managed application 108 and/or perform actions on behalf of the managed application 108.

In various embodiments, a communications component 112 may include an access point name (APN) proxy, a virtual private network (VPN) client and/or controller, a Wi-Fi client and/or controller, and/or other communication-related component. An APN proxy may include, for example, a cellular network APN proxy. A VPN client may include a device-level VPN client, a per-application VPN client, and/or other VPN client.

In various embodiments, a context of the mobile device 102 is determined. A context of the mobile device 102 may be determined by the management agent 104, platform management engine 106, and/or other component. Mobile device context information may be provided to the device management server 120. A context of the mobile device 102 may include, for example, a roaming state of the mobile device, a geolocation of the mobile device, a Wi-Fi network service set identification (SSID) associated with the device, and/or any other information. A roaming state of the mobile device 102 may indicate whether or not the mobile device is roaming. A mobile device 102 may be roaming if, for example, the device is communicating via a cellular network that is not its home cellular network. A mobile device 102 may be roaming if, for example, the device is communicating via a cellular network provider that is outside the geographic coverage area of the device's home network. In certain cases, a mobile device 102 is roaming if additional charges would be incurred by using the device in its current location, such as a country foreign to the home country of the mobile device 102. In various embodiments, roaming state information is generated based on the roaming state of the device. Roaming state information may include, for example, an indication that the mobile device is roaming, a roaming country in which the device is (currently) located, a roaming cellular network, and/or other roaming-related information.

In some embodiments, a platform management engine 106 determines a roaming state of the device based on information from the operating system of the device. In one example including an iOS device 102, the platform management engine 106 is associated with the device OS and can determine whether the device is roaming. The device OS may provide an indication (flag) to the platform management engine 106 when the device 102 transitions to a roaming state. In the event the device is roaming, roaming state information may be generated including a roaming country, roaming network, and/or other roaming-related information. The platform management engine 106 provides the roaming state information to the device management server 120 and/or other node. In some embodiments, a management agent 104 communicates and/or interfaces with the OS to determine whether the device is in a roaming state. In one example including a device 102 using the Android OS, a management agent 104 accesses an application programming interface (API) provided by the OS to determine a current cellular network of the device 102. The current cellular network of the device may be compared to a home cellular network of the device. The home cellular network of the device may be included in a subscriber identity module (SIM) card associated with the device, provided to the management agent 104 during registration of the device 102 with an MDM system, and/or otherwise determined. In this case, the management agent 104 may determine roaming state information of the device 102 based on the comparison of the current cellular network to the home cellular network. The management agent 104 provides the roaming state information to the device management server 120.

In some embodiments, the device management server 120 determines one or more traffic management policies based on mobile device context information (such as roaming state information, device location information, Wi-Fi SSID, and/or other information); data usage information; information associated with the mobile device; information associated with the mobile device user; and/or other information. In certain cases, the device management server 120 receives roaming state information from a platform management engine 106, management agent 104, and/or other component of a mobile device 102. The roaming state information may be used to dynamically determine one or more traffic management policies applicable to the device 102. A traffic management policy may dictate a manner in which traffic between the mobile device 102 and a node, such as an enterprise server 140, service 142, and/or other node, is to be processed. For example, a traffic management policy may dictate that data transferred between the mobile device and a node is to be filtered, blocked, compressed, encrypted, decrypted, and/or otherwise processed. Various example traffic management policies are discussed in detail below.

In various embodiments, information including the traffic management policy is provided from a device management server 120 to a proxy server 130. The proxy server 130 receives the traffic management policy and applies the policy to data transferred between the mobile device 102 and a node, such as an enterprise server 140, a service 142, and/or other nodes. An enterprise server 140 may include any server associated with an enterprise such as an enterprise file server, data server, and/or any other type of server. An enterprise server 140 may include a server associated with an enterprise service, such as an email service (e.g., Microsoft Exchange™), enterprise content management services (e.g., Microsoft Sharepoint™), and/or other services/resources. A service 142 may include any internet service such as a web-based email service, web services, a content streaming service, web sites, and/or any other internet services.

In some embodiments, information including the traffic management policy as well as a device identifier associated with the device 102 is provided from the device management server 120 to the proxy server 130. In some cases, the proxy server 130 may use the device identifier to identify traffic associated with the mobile device 102. For example, the proxy server 130 may receive traffic sent from various nodes to one or more mobile devices, and the proxy server 130 may use the device identifier to identify traffic sent to the mobile device 102. Similarly, the device identifier may be used to identify from which mobile device data was sent. The device identifier may be used to map a traffic management policy to data received at the proxy server 130.

In various embodiments, the device management server 120 generates mobile device configuration information based on mobile device context information received from the mobile device 102. The mobile device 102 may, for example, provide roaming state information, device location information, Wi-Fi SSID, and/or other information to the device management server 120. The device management server 120 may determine that the device is in a roaming state (e.g., the device is outside of its subscribed wireless coverage area). Based on the determination that the device 102 is in a roaming state, the device management server 120 generates mobile device configuration information to configure the device 102 for use in a roaming state. In some cases, the configuration information may configure a communications component 112 on the mobile device 102 to communicate with a proxy server 130 configured for roaming (e.g., a roaming proxy). The communications component 112 may include an access point name (APN) proxy, a virtual private network (VPN) client, a Wi-Fi client, and/or other communications component.

In various embodiments, configuration information is sent from the device management server 120 to the mobile device 102. In certain cases, configuration information is sent from the device management server 120 to the platform management engine 106. The platform management engine 106 may use the configuration information to configure a communications component 112 for use in a roaming state. In one example, the platform management engine 106 configures an APN proxy to direct traffic from the mobile device 102 to the proxy server. In another example, the platform management engine 106 configures a VPN client (such as a per-application VPN client) to route mobile device traffic to a VPN server associated with the proxy server 130. In some cases, configuration information is sent from the device management server 120 to a management agent 104 on the device 102. The management agent 104 may interface with the communications component 112 using an API provided by, for example, the device OS (e.g., an Android operating system). Using the API, the management agent 104 may update the settings associated with the communications component 112 based on the configuration information received from the device management server 120. For example, the management agent 104 may update the configuration of an APN proxy so that mobile device 102 traffic will be routed to an IP address and/or unique destination service port associated with the proxy server 130. In certain cases, multiple proxy servers 130 (e.g., roaming proxy servers) may be used, and a device 102 may be assigned to a specific proxy server 130 as identified by its IP address.

In various embodiments, the proxy server 130 monitors mobile device data usage. The proxy server 130 may monitor the mobile device's 102 roaming data usage, home network data usage, and/or other data usage. The proxy server 130 may monitor mobile device data usage including, for example, an amount of data downloaded to the device, an amount of data uploaded from the device, access times associated with various resources, applications that have accessed various resources, cellular phone usage time, a number of text messages sent and/or received, and/or other data usage information. In certain cases, the proxy server 130 may determine based on the monitored mobile device data usage that the mobile device 102 has exceeded and/or is close to exceeding one or more usage limit(s). A usage limit may include, for example, data usage limit, cellular phone minutes limit, text message limits, and/or any other usage limits. The proxy server 130 may determine that a device 102 has exceeded a usage limit, and an indication that the device 102 has exceeded a usage limit is provided to the device management server 120. Based on the indication that the device 102 has exceeded usage limits, the device management server 120 may determine a traffic management policy. The traffic management policy may be sent to the proxy server 130. The proxy server 130 may process data sent to the mobile device 102 based on the policy. For example, a traffic management policy may dictate that all data sent to the mobile device 102 be compressed to, for example, reduce data usage by the mobile device 102. In some embodiments, the device management server 120 may generate and send to a management agent 104, platform management engine 106, and/or other component on the device 102 an indication the device is close to exceeding and/or has exceeded a data usage limit. The management agent 104, platform management engine 106, and/or other component may generate and output an alert to the user stating the device 102 is close to and/or has exceeded a data usage limit.

Figure 2:
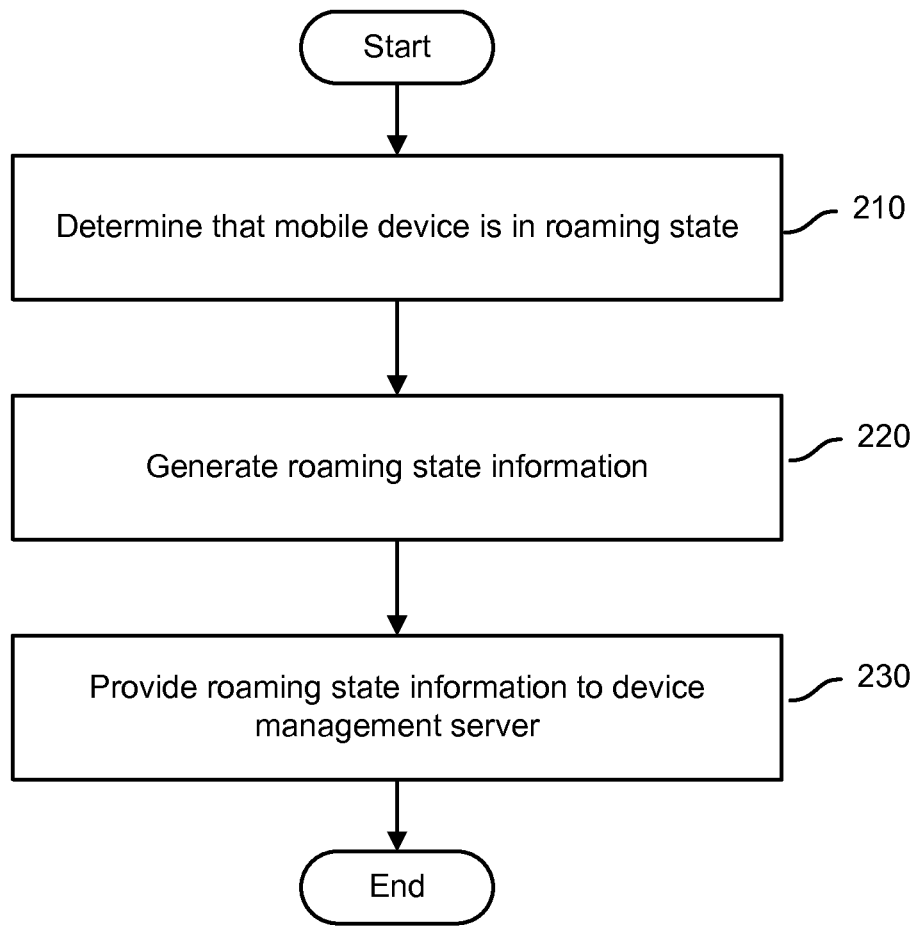
FIG. 2 is a flowchart illustrating embodiments of a process to provide roaming state information to a device management server.

FIG. 2 is a flowchart illustrating embodiments of a process to provide roaming state information to a device management server. In various embodiments, the process of FIG. 2 may be implemented on a mobile device, such as mobile device 102 of FIG. 1. The process of FIG. 2 may be implemented, for example, in mobile devices including the iOS operating system. In the example shown, it is determined (210) that a mobile device is in a roaming state. A device may be in a roaming state when the device is at a location outside of its subscribed wireless network coverage area. A device may also be roaming when the device is communicating via a cellular network that is not its home cellular network, such as a cellular network in a foreign country. A device may be roaming when the device is communicating via a cellular network that charges additional fees for data usage, cellular talk time, etc. In various embodiments, a platform management engine, such as platform management engine 106 of FIG. 1, determines that a mobile device is a roaming state. A platform management engine may be associated with an OS of a mobile device and may determine directly from the OS that the device is in a roaming state. The platform management engine may, for example, be configured to generate an indication and/or be provided an indication from the operation system of the mobile device when the device enters into a roaming state.

Roaming state information is generated (220). Roaming state information may include an indication that the device is roaming, a roaming country in which the device is located, a roaming cellular network via which the device communicating, a Wi-Fi network to which the device is connected (if any), and/or other information. In some cases, the roaming state information may include a geolocation of the mobile device, while in other cases the geolocation of the device may not be included in the roaming state information.

The roaming state information is provided (230) to a device management server. In various embodiments, the platform management engine provides the roaming state information to a device management server. As discussed below, the device management server may use the roaming state information to determine one or more traffic management policies applicable to the device (e.g., while the device is in a roaming state), mobile device roaming configuration information, and/or other information.

Figure 3:
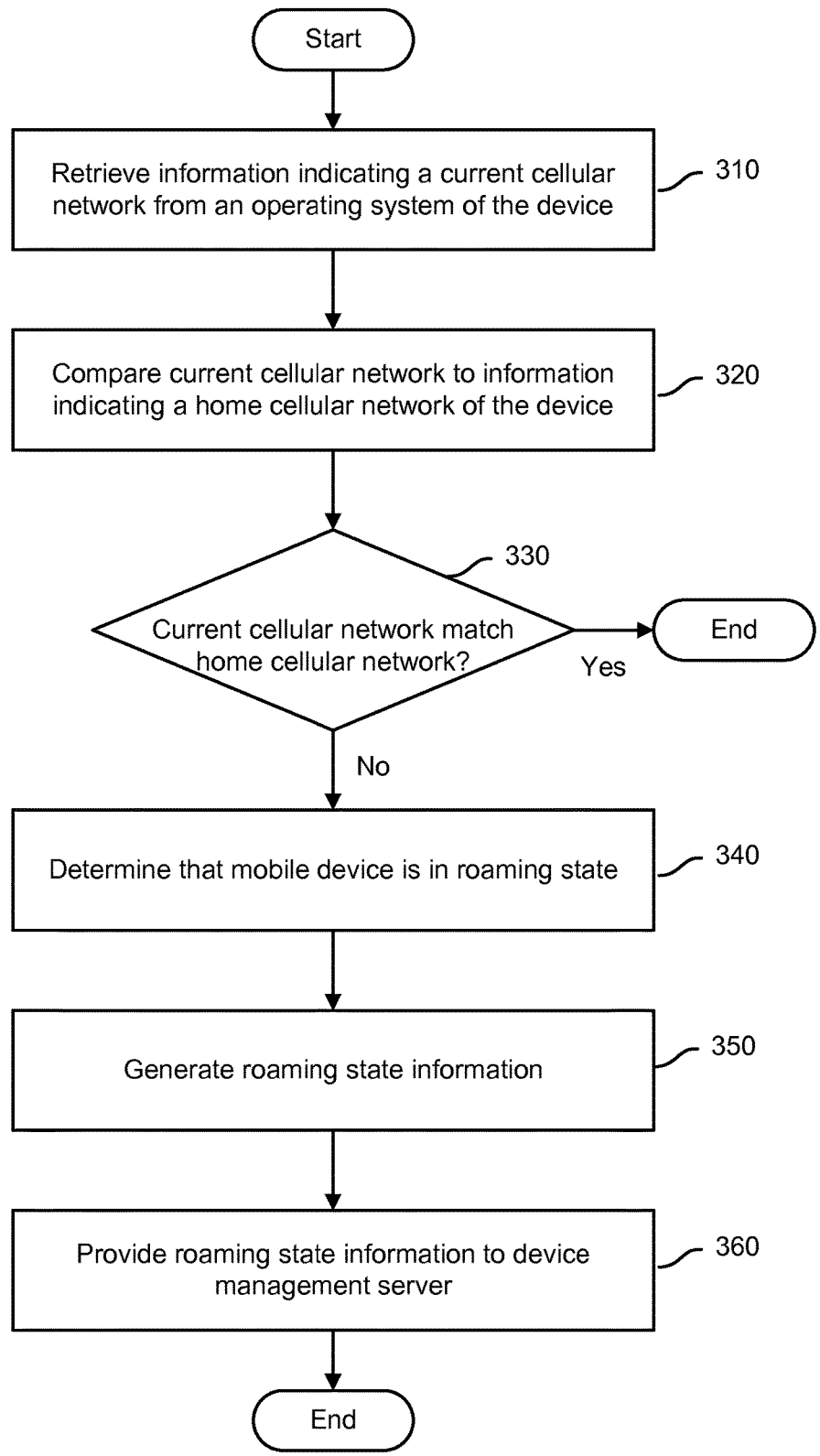
FIG. 3 is a flowchart illustrating embodiments of a process to provide roaming state information to a device management server.

FIG. 3 is a flowchart illustrating embodiments of a process to provide roaming state information to a device management server. In various embodiments, the process of FIG. 3 may be implemented on a mobile device, such as mobile device 102 of FIG. 1. The process of FIG. 3 may be implemented, for example, in mobile devices including the Android operating system. In the example shown, information indicating a current cellular network is retrieved (310) from an operating system of a mobile device. In various embodiments, a management agent (such as management agent 104 of FIG. 1) retrieves a current cellular network from an OS on a mobile device. The mobile device OS may, for example, expose an API and/or other interface that allows a management agent to a query a current cellular network of the mobile device. The current cellular network may include a cellular network via which the mobile device is currently communicating. In some cases, the management agent may determine the current cellular network periodically, in response to a trigger event, and/or at any other time. A trigger event may include a determination that the geo-location of the device has changed, a device power on event, a transition of the device from an airplane mode, and/or other trigger event.

The current cellular network is compared (320) to information indicating a home cellular network of the mobile device. The home cellular network of the mobile device may include a cellular network in which the mobile device is originally configured to communicate. A home cellular network may include a cellular network over which the mobile device is configured to communicate without incurring roaming fees and/or other additional fees. In some cases, the home cellular network of the device may be included in a subscriber identity module (SIM) card associated with the device. In this case, a management agent may query the mobile device SIM card to determine a home cellular network of the mobile device. In certain cases, the home cellular network of the mobile device is provided to the management agent and/or device management server during registration of the device with an MDM system.

It is determined whether the current cellular network matches (330) the mobile device's home cellular network. In various embodiments, the mobile device's home cellular network and networks associated with the home cellular network are compared to the current cellular network. For example, a provider associated with the home cellular network (e.g., AT&T) may be affiliated with one or more other cellular networks (e.g., T-Mobile) in such a manner that data transferred over the other cellular networks would not incur roaming fees. In some cases, the mobile device's home cellular network and networks affiliated with the home cellular network are compared to the current cellular network. In the event the current cellular network matches the mobile device's home cellular network and/or a network affiliated therewith, it is determined that the mobile device is not in a roaming state and/or the process may end. In the event the current cellular network does not match the mobile device's home cellular network and/or cellular networks affiliated therewith, the process proceeds to step 340.

It is determined (340) that the mobile device is in a roaming state. Based on a determination that the network over which the device is currently communicating does not match the mobile device's home network and/or any affiliated networks, it is determined that the mobile device is roaming (e.g., in a roaming state).

Roaming state information is generated (350). As discussed above, roaming state information may include an indication that the mobile device is roaming, a roaming country in which the device is located, a roaming cellular network via which the device communicating, a Wi-Fi network to which the device is connected (if any), and/or other information.

The roaming state information is provided (360) to the device management server. In various embodiments, the management agent provides the roaming state information to a device management server.

In various embodiments (not shown), steps 320 to 350 may be performed at the device management server. For example, the management agent may retrieve information indicating a current cellular network over which the mobile device is communicating, and the management agent may provide this information to the device management server. The device management server may compare the current cellular network to information indicating a home cellular network. For example, the home cellular network of the mobile device may be stored at the device management server during a registration process. In the event the current cellular network does not match the mobile device's home cellular network, the device management server determines that the mobile device is in a roaming state and generates roaming state information. In the event the current cellular network matches the mobile device's home cellular network, the device management server determines that the mobile device is not roaming (e.g., is not in a roaming state). In various embodiments, the device management server may determine a traffic management policy based on the determination that the device is in a roaming state.

In some embodiments, a management agent, platform management engine, and/or other component of a mobile device provides to the device management server information including a current geolocation of the mobile device. In this case, the device management server may use the current geolocation of the mobile device to determine whether the mobile device is in a roaming state. The device management server may, for example, compare the current geolocation of the mobile device to geographic boundaries of the device's home cellular network to determine whether the device is within or outside of its home cellular network. In the event the mobile device is determined to be outside of its home cellular network, it may be determined that the mobile device is in a roaming state.

Figure 4:
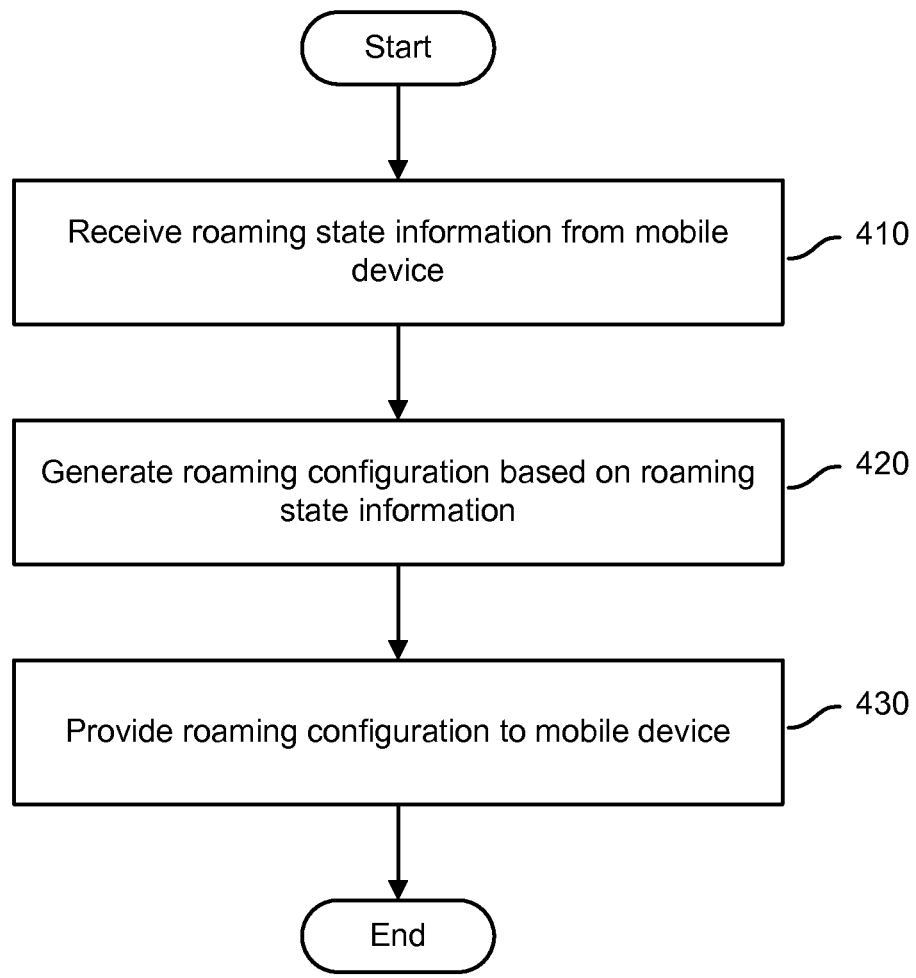
FIG. 4 is a flowchart illustrating embodiments of a process to provide a roaming configuration to a device.

FIG. 4 is a flowchart illustrating embodiments of a process to provide a roaming configuration to a device. In various embodiments, the process of FIG. 4 may be implemented at a device management server, such as device management server 120 of FIG. 1. In the example shown, roaming state information is received (410) from a mobile device. In various embodiments, a management agent, platform management engine, and/or other component of a mobile device provides roaming state information to the device management server.

Roaming configuration information is generated (420) based on the roaming state information. In various embodiments, a device management server determines and/or generates a mobile device roaming configuration based on roaming state information received from the mobile device. The device management server may, for example, evaluate the roaming state information to determine the roaming network over which the device is communicating, the roaming country (e.g., foreign country) in which the device is communicating, and/or other roaming-related information. Based on the roaming state information, the device management server may determine that the mobile device is to be configured to route traffic to a proxy server (e.g., a roaming proxy server) for processing (e.g., compression, filtering, encryption, etc.) using the techniques disclosed herein. Roaming configuration information may be used to configure a communications component (such as an APN proxy, a VPN client, a Wi-Fi client/controller, and/or other communications component) on the mobile device to route device traffic to the roaming proxy server while, for example, the mobile device is roaming.

In one example, roaming configuration information includes a configuration for an APN proxy. The roaming configuration information may be used to configure the APN proxy, such as the mobile device's cellular network APN proxy client, to communicate with a proxy server, such as a roaming proxy server. In one example, a mobile device may be configured when not in a roaming state, to communicate directly with enterprise servers, services, and/or other resources. Based on the roaming state information, the device management server may generate a roaming configuration to configure the APN proxy to route data from the mobile device to a roaming proxy server. The configuration information may include, for example, an internet protocol (IP) address, a port number (such as a unique destination service port number) and/or other information to configure the device to access the proxy server. In certain cases, multiple roaming proxy servers may be deployed, and roaming configuration information may assign a mobile device to communicate with a specific roaming proxy server. The roaming proxy server may be identified by an IP address included in the roaming state information. In some cases, a mobile device may be provided a unique destination service port number at the proxy server, and the proxy server may be configured to identify traffic received at the unique destination service port number as being sent from the device.

In another example, roaming configuration information includes a configuration for a VPN client on the device. The configuration may be used to configure a VPN client to communicate with a VPN server associated with a roaming proxy server. The configuration may configure the mobile device to send traffic to the proxy server over a secure tunnel between the VPN client and a VPN server associated with the proxy server. In certain cases, VPN configuration information may include a device identifier (e.g., device ID). The device identifier is used to establish the connection between the VPN client and VPN server. And the proxy server to identify a sender mobile device associated with data received from the proxy server may use the device identifier.

In a further example, roaming configuration information includes information to configure managed applications to securely send data to a roaming proxy server. For example, a managed application may include a library and/or wrapper, which configures the managed application to be controlled by a management agent on the device. In this case, roaming configuration is sent to the management agent, and the management agent uses the roaming configuration information to configure one or more managed applications to provide data to the roaming proxy server.

Roaming configuration information is provided (430) to the mobile device. In various embodiments, roaming configuration information is provided to a management agent, a platform management engine, and/or other component of a mobile device.

Figure 5:
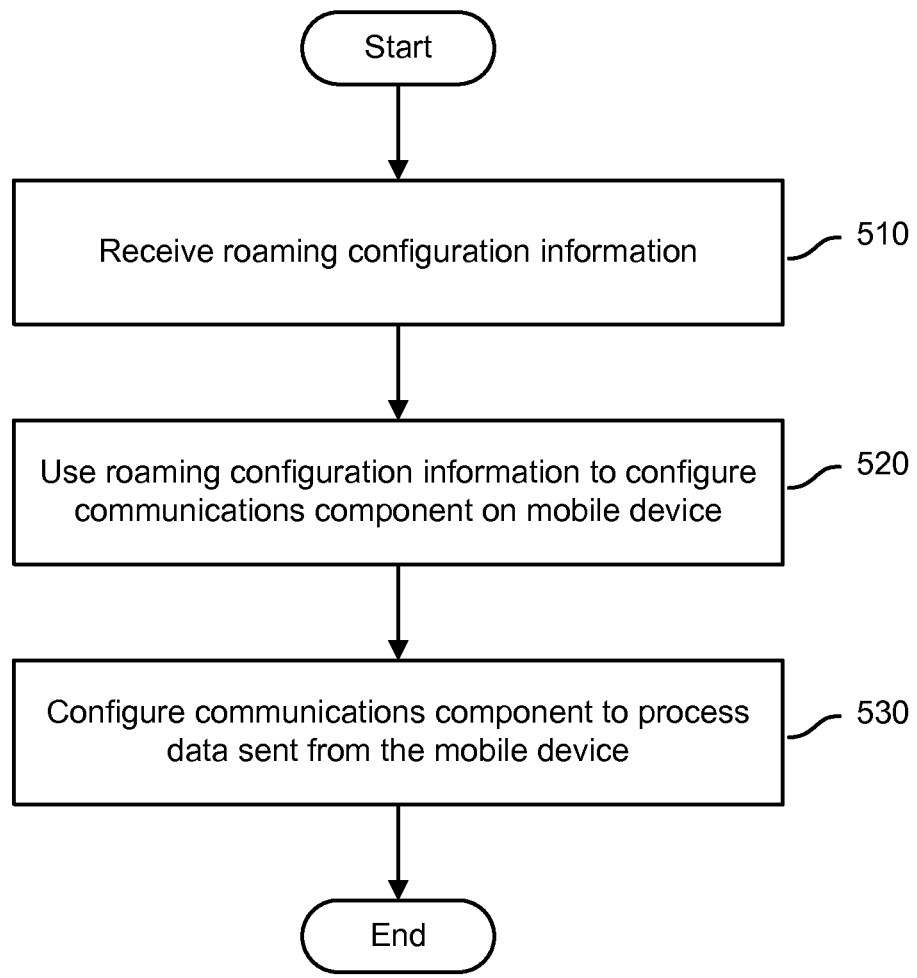
FIG. 5 is a flowchart illustrating embodiments of a process to configure a communications component on a mobile device.

FIG. 5 is a flowchart illustrating embodiments of a process to configure a communications component on a mobile device. In the example shown, roaming configuration information is received (510). In various embodiments, roaming configuration information is received from a device management server. In some cases, roaming configuration information is received at a management agent on a mobile device. For example, roaming configuration information may be received at a management agent on a mobile device running the Android operating system. In other cases, roaming configuration information is received at a platform management engine. For example, roaming configuration information may be received at a platform management engine on a mobile device running the iOS operating system.

Roaming configuration information is used (520) to configure a communications component on a mobile device to communicate with a roaming proxy. In various embodiments, a platform management engine uses roaming configuration information to configure a communications component to send data to and/or receive data from a roaming proxy. In one example, the platform management engine configures an APN proxy to direct traffic from the mobile device to a proxy server, such as a proxy server configured for use when a device is roaming. The APN proxy may be associated with and/or configurable by the operating system of the mobile device, and the platform management engine may directly configure the APN proxy to communicate with the proxy server. In another example, the platform management engine configures a VPN client (such as a per-application VPN client) to route mobile device traffic to a VPN server associated with a proxy server, such as a proxy server configured for use when a device is roaming. The VPN client may be controlled by and/or otherwise associated with the OS of the mobile device, and the platform management engine, which may be a component of the OS, directly configures the VPN client to route mobile device traffic to a VPN server associated with the proxy server. In another example, the platform management engine uses configuration information to configure a Wi-Fi client on the device to send data to the proxy server.

In some embodiments, a management agent uses roaming configuration information to configure a communications component to send data to and/or receive data from a roaming proxy. A management agent may interface with a communications component using an API provided by, for example, the device OS (such as an Android operating system). Using the API, the management agent may update the settings associated with the communications component based on the roaming configuration information received from the device management server. For example, the management agent may update the configuration of an APN proxy so that mobile device traffic will be routed to an IP address and/or unique destination service port associated with the proxy server. In certain cases, multiple proxy servers (e.g., roaming proxy servers) may be deployed to, for example, communicate with a fleet of devices included in an MDM system. In this case, the roaming configuration information may configure a communications component on a device to communicate with a specific proxy server.

In various embodiments, a mobile device communications component (e.g., APN proxy, VPN client, etc.) is configured to route all mobile device traffic to a roaming proxy. In this case, traffic from all applications and/or other components of a device is sent via the communications component to the roaming proxy server. In some cases, all traffic sent to the mobile device from various nodes (e.g., enterprise servers, internet services, etc.) is provided to the device via the roaming proxy server.

In some embodiments, a mobile device communications component is configured to selectively route traffic to a roaming proxy. In one example, traffic sent from each of a first set of applications to various nodes is sent via the communications component to the roaming proxy server.

Traffic sent from a second set of applications to various nodes is not sent to the roaming proxy server. Similarly, traffic sent from various nodes to the first set of applications is sent to the applications via the roaming proxy server, while traffic sent to the second set of applications is not sent via the roaming proxy server.

The communications component is configured (530) to process data sent from the mobile device. In various embodiments, a mobile device communications component is configured to process data for transmission to one or more destinations, such as an APN proxy server, a VPN server, an enterprise service, and/or other destinations. In certain cases, the mobile device communications component is configured based on a traffic management policy to process data using the techniques disclosed herein. For example, the communications component may be configured to perform any of the processing operations disclosed herein (e.g., as being performed at the proxy server). The communications component may, for example, optimize upload traffic sent to various destinations.

Figure 6:
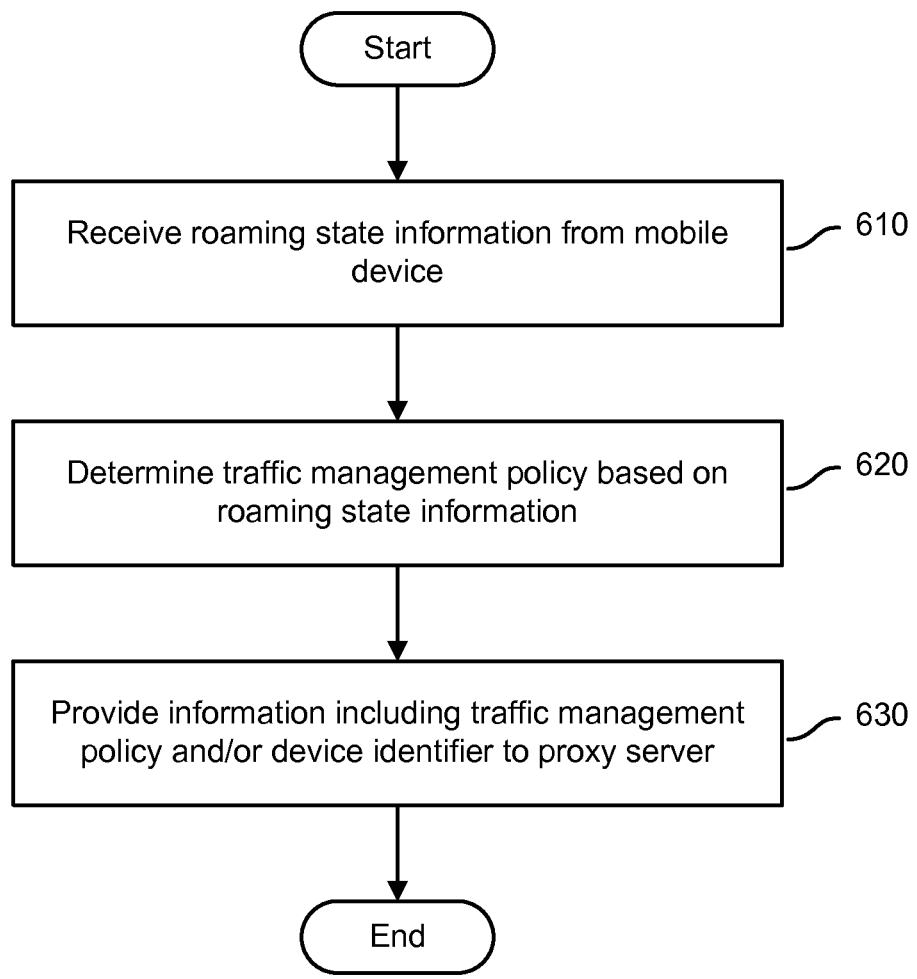
FIG. 6 is a flowchart illustrating embodiments of a process to determine a traffic management policy.

FIG. 6 is a flowchart illustrating embodiments of a process to determine a traffic management policy. In various embodiments, the process of FIG. 6 may be implemented at a device management server, such as device management server 120 of FIG. 1. Roaming state information is received (610) from a mobile device. In various embodiments, a management agent, platform management engine, and/or other component of a mobile device provides roaming state information to the device management server.

One or more traffic management policies are determined (620) based on the roaming state information. In various embodiments, a traffic management policy is determined based on the roaming state information, the identity of the mobile device, the user of the mobile device, nodes (e.g., enterprise servers, internet services, etc.) with which the mobile device communicates, a security posture of the mobile device, and/or any other information associated with the mobile device.

In some cases, a traffic management policy is determined based on roaming state information, such as a roaming country, roaming cellular network, and/or other information related to the roaming state of the mobile device. A traffic management policy may be determined, for example, based on a roaming cellular network over which the device is communicating. One example traffic management policy may dictate that data transferred between a node and the mobile device be compressed to, for example, reduce the amount of data transferred over a roaming cellular network. In certain cases, a traffic management policy may dictate that data be compressed using lossy compression techniques. Another example traffic management policy may dictate that data (such as documents, emails, etc.) including rich media (such as images or video) and text may be processed to only send the text portion of the content across a roaming cellular network. A further example traffic management policy may dictate that data transferred over a particular roaming cellular network is to be encrypted. By way of example, it may be determined that a roaming cellular network, Wi-Fi network, and/or other network over which the device is communicating is not secure. Based on this determination, a traffic management policy that dictates that data be encrypted prior to transfer over a cellular network, Wi-Fi network, and/or other connection may be applied to the mobile device.

In some cases, a traffic management policy is determined based on roaming state information as well as information associated with the mobile device (e.g., an identity of the mobile device), the mobile device user, and/or other information associated with the mobile device. In certain cases, a traffic management policy is determined based on an identity of a user and/or a group of which the user is a member. In one example, a user may be a management level employee of an enterprise, and a traffic management policy associated with management level employees may be determined to apply to the user. An example traffic management policy applicable to management level employees may dictate that data not be processed (e.g., not be compressed, filtered, blocked, etc.). In another example, a user of the mobile device may be a lower-level employee, and a traffic enforcement policy applicable to lower-level employees may dictate that all data sent to the mobile device be compressed while a device is in a roaming state.

In some cases, a traffic management policy is determined based roaming state information as well as information associated with a node with which the device is communicating. One example traffic management policy may dictate that data sent from certain node(s) to a mobile device be blocked, filtered, compressed, and/or otherwise processed. For example, a traffic management policy may require that traffic sent from certain internet service(s) to a mobile device be blocked. A further example traffic management policy may dictate that content sent from certain sources, such as an internet streaming video website, be filtered while content sent from other sources, such as an enterprise server, be transferred unprocessed. An additional example traffic management policy may include a whitelist of nodes including, for example, enterprise servers and/or internet services. Applying the policy, traffic from any of the nodes included on the whitelist may be provided to the mobile device unprocessed while traffic from other nodes (not on the whitelist) may be filtered, compressed, encrypted, blocked, and/or otherwise processed. A further example traffic management policy may include a blacklist of nodes. In one example, a blacklist may include social network web sites, streaming video web sites, internet services, and/or other services. Applying the policy, traffic from nodes included on the blacklist may be filtered, compressed, encrypted, blocked, and/or otherwise processed according to the policy. Traffic from nodes not included on the blacklist may be provided to the mobile device unprocessed.

In various embodiments, a traffic management policy is updated as information associated with the mobile device changes. For example, roaming state information may be continually updated as the mobile device moves from cellular network to cellular network. Traffic management polic(ies) applicable to the mobile device may be updated as the roaming state information is updated. In another example, a security posture of the mobile device may change over time, and traffic management polic(ies) applicable to the mobile device may be updated based on the changed security posture. Any change to information associated with a mobile device and/or its user may trigger a change to a traffic management policy.

In the example shown, information including the traffic management policy and/or a device identifier are provided (630) to a proxy server. In various embodiments, the traffic management policy is pushed to the proxy server. The proxy server may apply the traffic management policy to data transferred between a mobile device and one or more nodes. In some cases, a device identifier is provided to the proxy server along with a traffic management policy. The device identifier may be used to identify data to which the traffic enforcement policy is to be applied.

Figure 7:
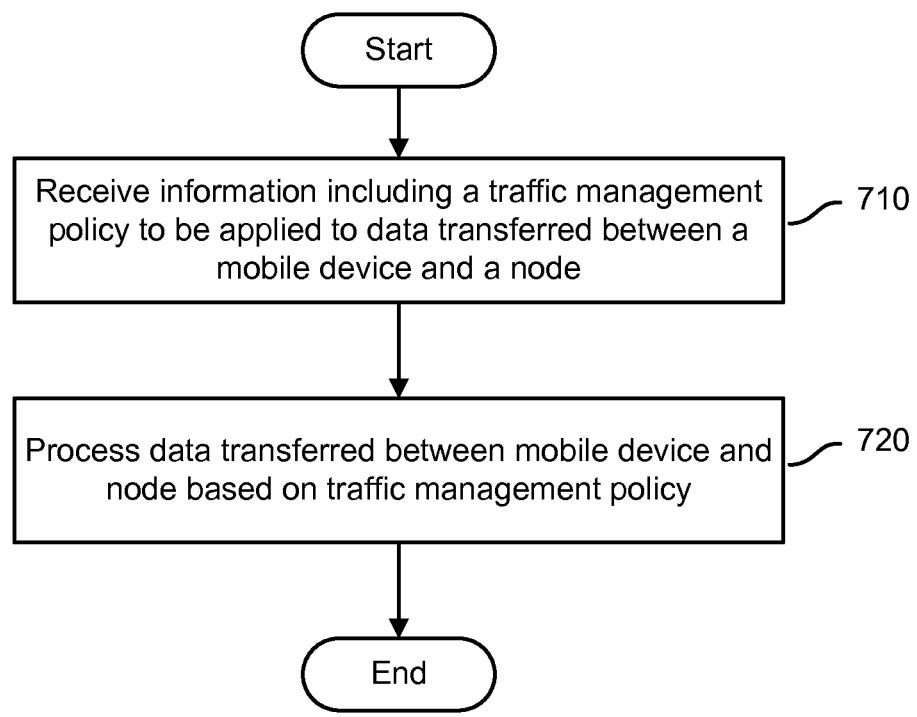
FIG. 7 is a flowchart illustrating embodiments of a process to process data transferred between a mobile device and node.

FIG. 7 is a flowchart illustrating embodiments of a process to process data transferred between a mobile device and node. In various embodiments, the process of FIG. 7 may be implemented at a proxy server, such as proxy server 130 of FIG. 1. Information including a traffic management policy to be applied to data transferred between a mobile device and a node is received (710). In various embodiments, the proxy server includes a proxy server configured to process data transferred between a mobile device and a node when, for example, the mobile device is in a roaming state. The proxy server may include, for example, a Hypertext Transfer Protocol (HTTP) proxy, a VPN server, a reverse proxy, and/or other type of server. The proxy server may include a roaming proxy server (e.g., a roaming sentry). In various embodiments, the roaming proxy server may include a standalone proxy server, which is, for example, configured to process data transferred between a mobile device and various nodes while the mobile device is in a roaming state. In some embodiments, a proxy server may include a roaming proxy server and/or components that perform the functions of the roaming proxy server as discussed herein.

In the example shown, data transferred between a mobile device and a node is processed (720) based on the traffic management policy. In various embodiments, the traffic management policy is applied to data sent from various nodes (e.g., enterprise server, internet services, etc.) to a mobile device. Applying the traffic management policy to data sent from a node to the mobile device, the proxy server may process data by, for example, compressing the data, blocking the data, encrypting the data, not processing the data, and/or otherwise processing the data. In one example, a traffic management policy may dictate that data sent from a certain service (e.g., a video streaming service) is to be blocked, data sent from a web-based email service is to be filtered to compress and/or block email attachments above a certain size (e.g., 200 KB), and/or traffic from enterprise servers is to be provided to the mobile device unprocessed. Applying the traffic management policy, data from an internet video streaming site may be blocked while data sent from an enterprise server is sent to the mobile device unprocessed. Data sent from the web-based email service is processed to detect, compress and/or block email attachments larger than 200 KB. In another example, a traffic management policy may dictate that all data sent to the mobile device over the roaming cellular network be compressed using lossy compression techniques. Applying this traffic management rule, a two megabyte image file may be compressed to a 200 KB image file using a lossy compression technique.

In some embodiments, the traffic management policy is applied to data sent from a mobile device to one or more nodes. As discussed above, roaming configuration information may be provided to the mobile device, and a management agent, platform management engine, and/or other component may use the roaming configuration information to configure a communications component of the device to send traffic to the proxy server. Traffic received from the mobile device at the proxy server may be processed according to a traffic management policy applicable to the device. For example, a traffic management policy may dictate that requests to video streaming service be blocked, and the proxy server may block any requests from applications on the mobile device to the video streaming service. In some cases, the proxy server and/or device management server may send a message to the mobile device indicating that access to the video streaming service is temporarily blocked.

Figure 8:
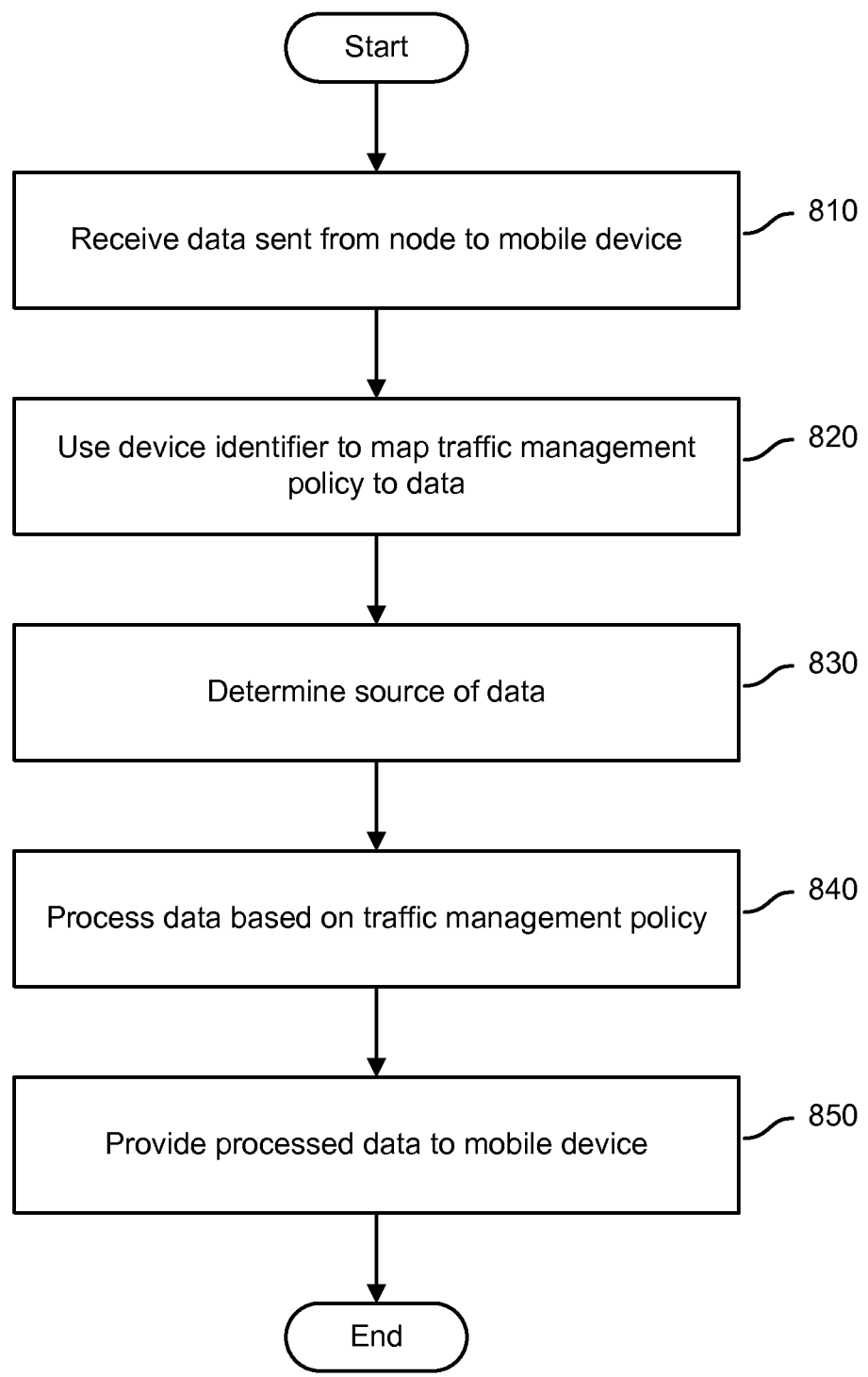
FIG. 8 is a flowchart illustrating embodiments of a process to process data based on a traffic management policy.

FIG. 8 is a flowchart illustrating embodiments of a process to process data based on a traffic management policy. In various embodiments, the process of FIG. 8 may be implemented at a proxy server, such as proxy server 130 of FIG. 1. In the example shown, data sent from a node to a mobile device is received (810) at a proxy server. In various embodiments, data sent from a node, such as an enterprise server, internet service, and/or other node, to a mobile device is received at a proxy server. For example, a mobile device may send a request to an enterprise server via the proxy server to retrieve to retrieve data, and in response to the request, the enterprise server sends the data to the mobile device via the proxy server.

In the example shown, a device identifier is used to map (820) a traffic management policy to the data. In various embodiments, a device identifier is received from a mobile device management server along with a traffic management policy. The device identifier may indicate, for example, a mobile device to which the traffic management policy is applicable. The device identifier may be used to identify data sent from a node (such as an enterprise server, internet service, etc.) to a particular mobile device that is associated with the device identifier. In some cases, data sent from a node to a mobile device may include information identifying the destination mobile device. Information identifying a destination mobile device may be included in, for example, a header of a packet, a tag associated with data, and/or another portion of data. The device identifier associated with a traffic management policy may be compared to the information identifying a destination mobile device. Based on the comparison, it may be determined whether the data is sent to a mobile device associated with the device identifier. In the event the data is determined to be sent to a mobile device associated with the device identifier, a traffic management policy associated with the device identifier and/or applicable to the mobile device is mapped to and/or applied to the data.

In various embodiments, a source of the data is determined (830). In some embodiments, a traffic management policy may include rules to be applied based on the source and/or sender of the data. In this case, the source of data sent to a mobile device is determined. An IP address, uniform resource locator (URL), and/or other identifier associated with the data may be used to determine a source of the data. Data received at the proxy server may be processed to determine an identifier associated with the source of the data. By way of example, a traffic management policy may dictate that data from various websites included in a blacklist of websites (such as social media websites, entertainment-related websites, streaming video sites, etc.) be blocked. Applying the traffic management policy to data received from a website, a URL and/or other identifier associated with the website may be is determined. In the case that the URL matches a URL of a blacklisted website, the data may be blocked at the proxy server. In another example, an IP address associated with data sent from an enterprise server may be determined by processing the data at the proxy server.

In some embodiments, step 830 may be optional. For example, step 830 may not be not necessary and therefore not performed when a traffic management policy is applicable to all data sent to a mobile device regardless of the source.

In the example shown, data is processed (840) based on the traffic management policy. In various embodiments, a traffic management policy includes rules for processing data transferred between a mobile device and a node. Continuing with the example above, a data management policy may dictate that data transferred from one or more websites included in a blacklist of websites be blocked. Applying the traffic management policy, data from a sent from a streaming video site to a mobile device is blocked and/or an indication is provided to the mobile device user that streaming video has been blocked while the device is roaming.

The processed data is provided (850) to the mobile device. In various embodiments, the proxy server provides the processed data to the mobile device via, for example, a roaming cellular network, Wi-Fi connection (if available), and/or other network. In some cases, the proxy server determines the device to which the processed data is to be sent based on the device identifier received from the device management server. In various embodiments step 850 may not be performed. For example, a traffic management policy may require that data sent from a node to a device be blocked, and in this case, the blocked data is not provided to the device.

Figure 9:
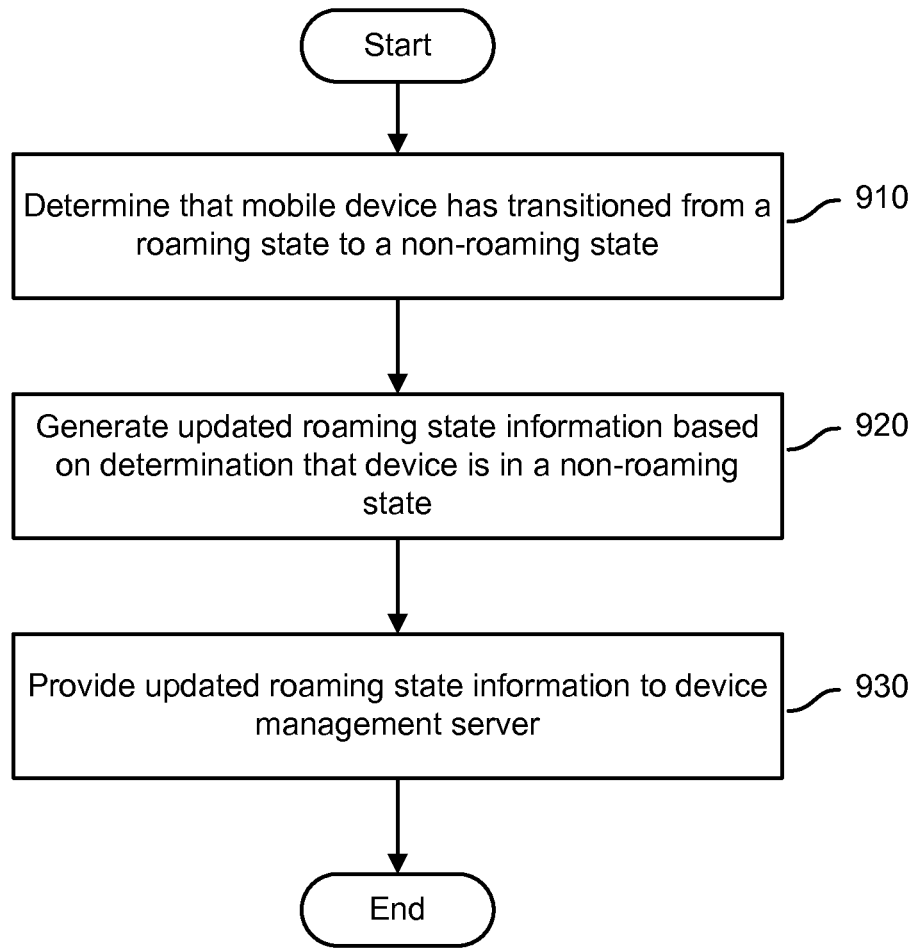
FIG. 9 is a flowchart illustrating embodiments of a process to generate updated roaming state information.

FIG. 9 is a flowchart illustrating embodiments of a process to generate updated roaming state information. In various embodiments, the process of FIG. 9 may be implemented at a mobile device, such as mobile device 102 of FIG. 1. The process of FIG. 9 may be performed, for example, after a time when a mobile device is determined to be in a roaming state. In the example shown, it is determined (910) that a mobile device has transitioned from a roaming state to a non-roaming state. A mobile device may be in a non-roaming state if, for example, it is determined that the mobile device is communicating over its home cellular network and/or a network affiliated with the home network. A mobile device may be in a non-roaming state if, for example, roaming fees are not applied to data transferred over the cellular network to which the device is connected.

In various embodiments, a platform management engine determines that a device has transitioned from a roaming state to a non-roaming state based on an indication, such as a flag, from the operating system of a mobile device. For example, a mobile device OS may be configured to generate a notification when the device transitions in and/or out of roaming state, and the notification is provided to the platform management engine. In some embodiments, a management agent determines that a mobile device has transitioned from a roaming state to a non-roaming state based on a comparison of the mobile device's home network to a cellular network over which the mobile device is currently communicating. As discussed above, the management agent may determine a current cellular network by accessing an API associated with the OS of the device. In the event it is determined that the current cellular network matches and/or is affiliated with the mobile device's home cellular network, it may be determined that the mobile device has transitioned from a roaming state to a non-roaming state.

Updated roaming state information is generated (920) based on the determination that the mobile device has transitioned from a roaming state to a non-roaming state. Updated roaming state information may include, for example, an indication that the mobile device is communicating via its home cellular network. The updated roaming state information may be generated by, for example, a management agent, platform management engine, and/or other node on the mobile device.

Updated roaming state information is provided (930) to a device management server. In various embodiments, a management agent, platform management engine, and/or other component on the device provides the updated roaming state information to the device management server.

In various embodiments (not shown), one or more of steps 910 thru 930 may be performed at the device management server. For example, the device management server may determine that the mobile device has transitioned from a roaming state to a non-roaming state based on, for example, device context information, such as geolocation information, received from the mobile device.

Figure 10:
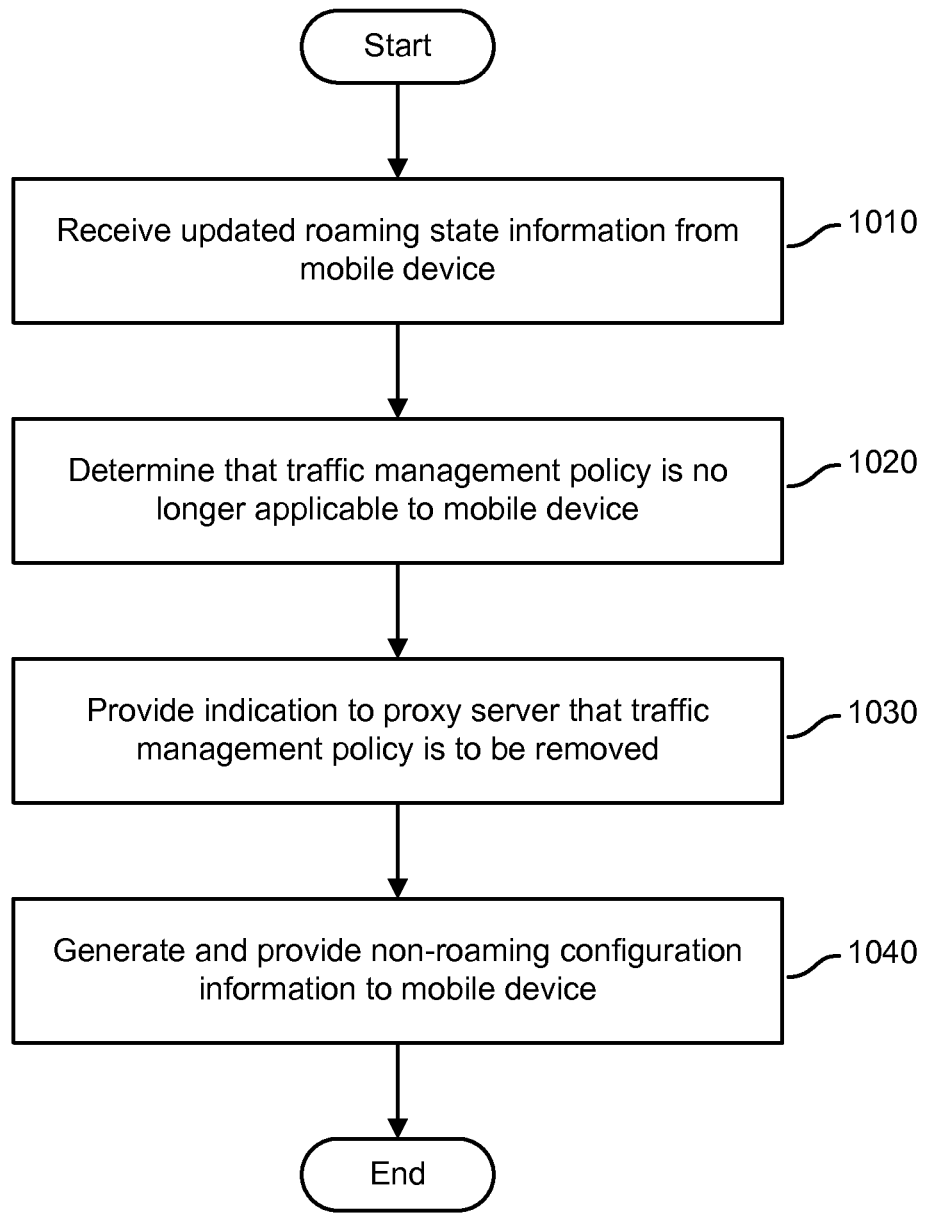
FIG. 10 is a flowchart illustrating embodiments of a process to configure a device for non-roaming usage.

FIG. 10 is a flowchart illustrating embodiments of a process to configure a device for non-roaming usage. In various embodiments, the process of FIG. 10 may be implemented at a device management server, such as device management server 120 of FIG. 1. Updated roaming state information is received (1010) from a mobile device. In various embodiments, updated roaming state information may include an indication that the device is not in a roaming state and/or is communicating via its home cellular network and/or a network affiliated with the device's home cellular network. Updated roaming state information may be received from, for example, a management agent, platform management engine, and/or other component of a mobile device.

It is determined (1020) that a traffic management policy is no longer applicable to the mobile device. In various embodiments, it is determined that a traffic management policy is to be removed based on the updated roaming state information. In one example, it is determined that the mobile device is not in a roaming state, and a traffic management policy implemented based on a previous determination that the device was in a roaming state is removed.

An indication is provided (1030) to a proxy server that the traffic management policy is to be removed. In various embodiments, the device management server provides a command to a roaming proxy server to remove and/or deactivate a traffic management policy (e.g., associated with roaming). The roaming proxy server may remove and/or deactivate the traffic management policy based on the receipt of the indication.

Non-roaming configuration information is generated and provided (1040) to the mobile device. In various embodiments, a device management server determines that the device has transitioned from a roaming state to a non-roaming state. Based on this determination non-roaming configuration (e.g., home country configuration) is generated. A non-roaming configuration may be used to configure a mobile device for usage in its home cellular network, home geographical region, and/or other area. The non-roaming configuration information is provided to the mobile device. The non-roaming configuration information may be provided to a management agent, platform management engine, and/or other component on the device.

Figure 11:
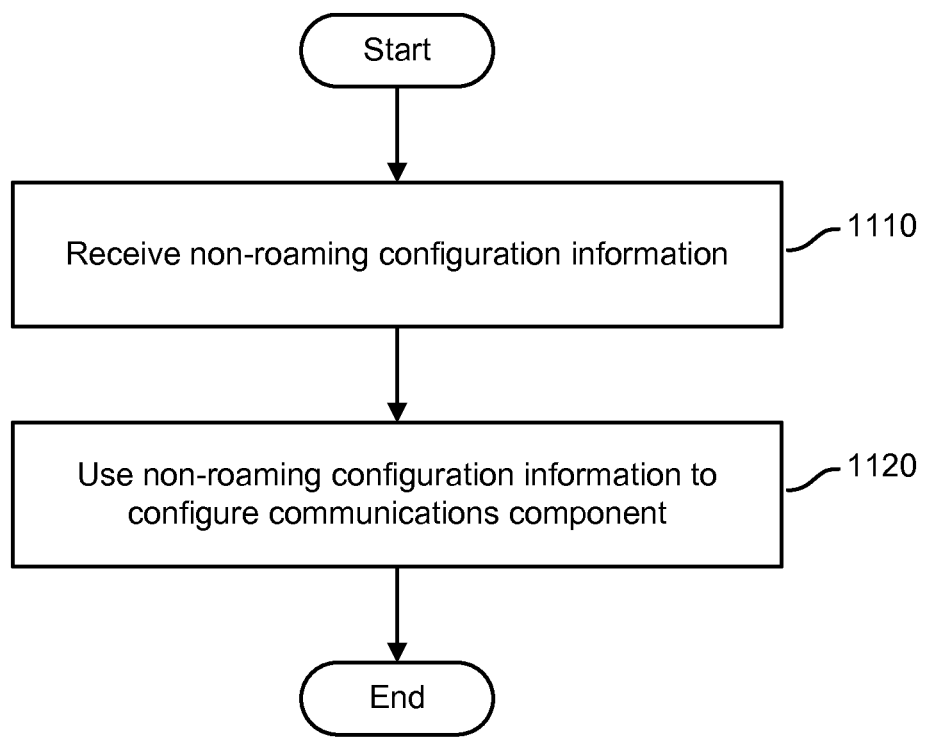
FIG. 11 is a flowchart illustrating embodiments of a process to configure a communications component on a mobile device for home network usage.

FIG. 11 is a flowchart illustrating embodiments of a process to configure a communications component on a mobile device for home network usage. In various embodiments, the process of FIG. 11 may be implemented on a mobile device, such as mobile device 102 of FIG. 1. Non-roaming configuration information (e.g., home cellular network configuration information) is received (1110). In various embodiments, non-roaming configuration information is received at a management agent on the mobile device. In some embodiments, non-roaming configuration information is received at a platform management engine.

Non-roaming configuration information is used (1120) to configure a communications component. In various embodiments, the non-roaming configuration information is used to configure communications components of a mobile device for home network usage. In certain cases, non-roaming configuration information may be used to configure a communications component on the device to not send and/or no longer send mobile device traffic to a roaming proxy server (e.g., a proxy server configured for use while the device is roaming). The non-roaming configuration information may configure a communications component for home country use and/or return the communications component to default settings.

In some embodiments, the non-roaming configuration information may be used to configure an APN proxy for home cellular network usage. A management agent, platform management engine, and/or other component may use the non-roaming configuration information to configure the APN proxy using the techniques disclosed herein (e.g., in FIG. 5). The APN proxy may be configured to, for example, send data to a proxy server separate from a roaming proxy server and/or other nodes. In another example, an APN proxy may be disabled.

In various embodiments, non-roaming configuration information is used to configure a VPN client to communicate with a VPN server separate from a roaming proxy server. A management agent, platform management engine, and/or other component may, for example, use the non-roaming configuration information to configure the VPN client using the techniques disclosed herein (e.g., in FIG. 5). In certain cases, the VPN client may be disabled based on the non-roaming configuration information.

Figure 12:
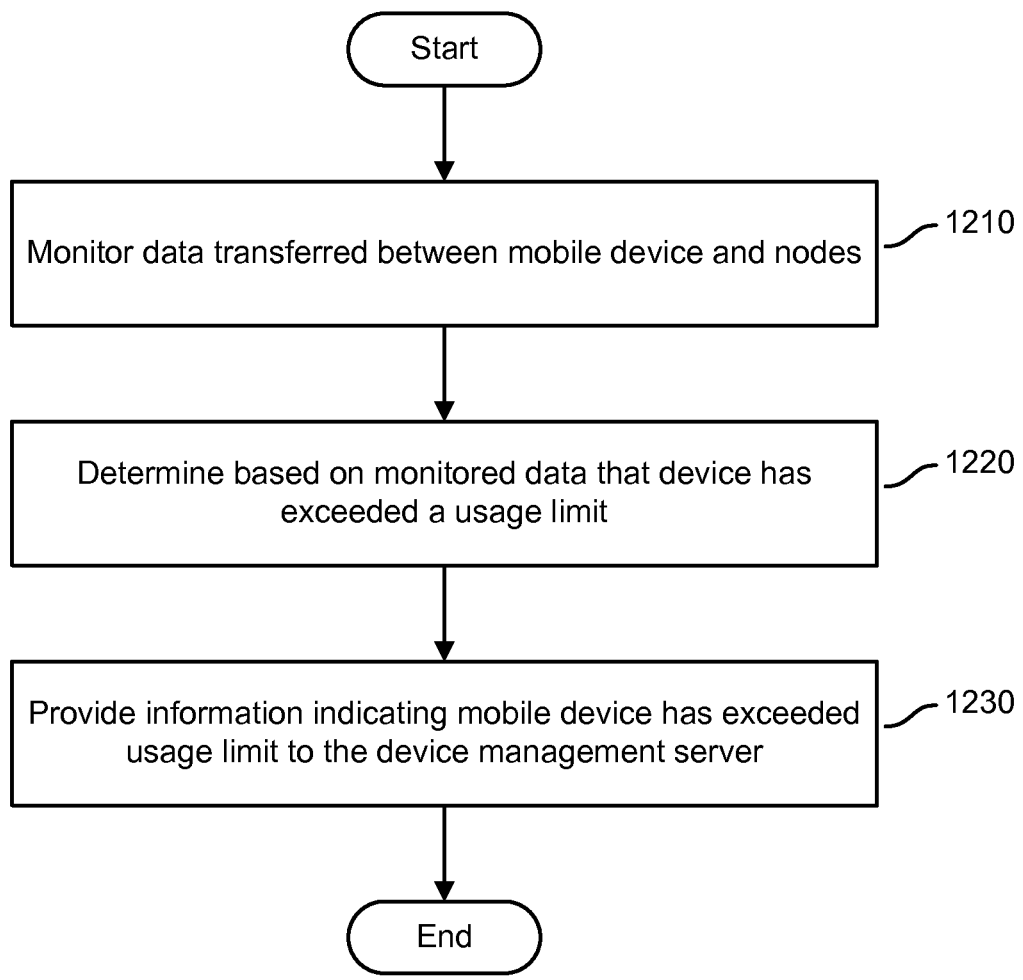
FIG. 12 is a flowchart illustrating embodiments of a process to manage mobile device traffic.

FIG. 12 is a flowchart illustrating embodiments of a process to manage mobile device traffic. In various embodiments, the process of FIG. 12 is performed at proxy server 130 of FIG. 1. Data transferred between a mobile device and various nodes is monitored (1210). In various embodiments, a proxy server monitors data transferred between a mobile device and various nodes via the proxy server. In one example, the proxy server monitors data usage by a mobile device, such as an amount of data (e.g., number of kilobytes, megabytes, etc.) sent to and/or received from various nodes. The proxy server may, for example, determine an amount of data communicated between a mobile device and various nodes during a period of time, such as a cellular plan billing period/cycle. In another example, the proxy server monitors cellular communication minutes over a period of time, such as a cellular plan billing period. In a further example, the proxy server monitors a number of text message sent and/or received by the device over a period of time, such as a cellular plan billing period.

It is determined (1220) based on the monitored data the mobile device has exceeded a usage limit. In various embodiments, the proxy server may compare an amount of data used to a usage limit associated with the mobile device. A usage limit may include a data usage limit, a cellular minutes usage limit, a text message limit, and/or other usage limit. In certain cases, a usage limit may be defined by an enterprise, set by a user, determined based on the user's cellular phone plan, and/or otherwise defined. In certain cases, a usage limit may include a warning limit that is less than a cellular phone plan usage limit. For example, a usage limit may be set a 50 MB warning limit when the mobile device's cellular plan includes a 100 MB data usage and/or roaming data usage plan. The warning limit may be set by an enterprise to, for example, warn its employees when they are close to exceeding their data plan and/or to implement traffic management policies to reduce data transfer between the mobile device and various nodes. Based on a comparison of the monitored data usage, cellular communication minutes, text messages, and/or other data to one or more usage limits, it may be determined that the mobile device has exceeded a usage limit and/or is close to exceeding a usage limit.

Information indication that the mobile device has exceeded a usage limit is provided (1230) to the device management server. In various embodiments, the proxy server sends the device management server a notification that the mobile device has exceeded usage limit and/or is close to exceeding a usage limit. The notification may include an amount of data used by the mobile device over a period, a number of cellular communication minutes used by the mobile device over a period, a number of text messages transmitted and/or received by the device over a period, and/or other information. In certain cases, the notification information may include an amount of usage (e.g., amount of data usage, number of cellular minutes, number of text messages, etc.) that exceeds the usage limit.

Figure 13:
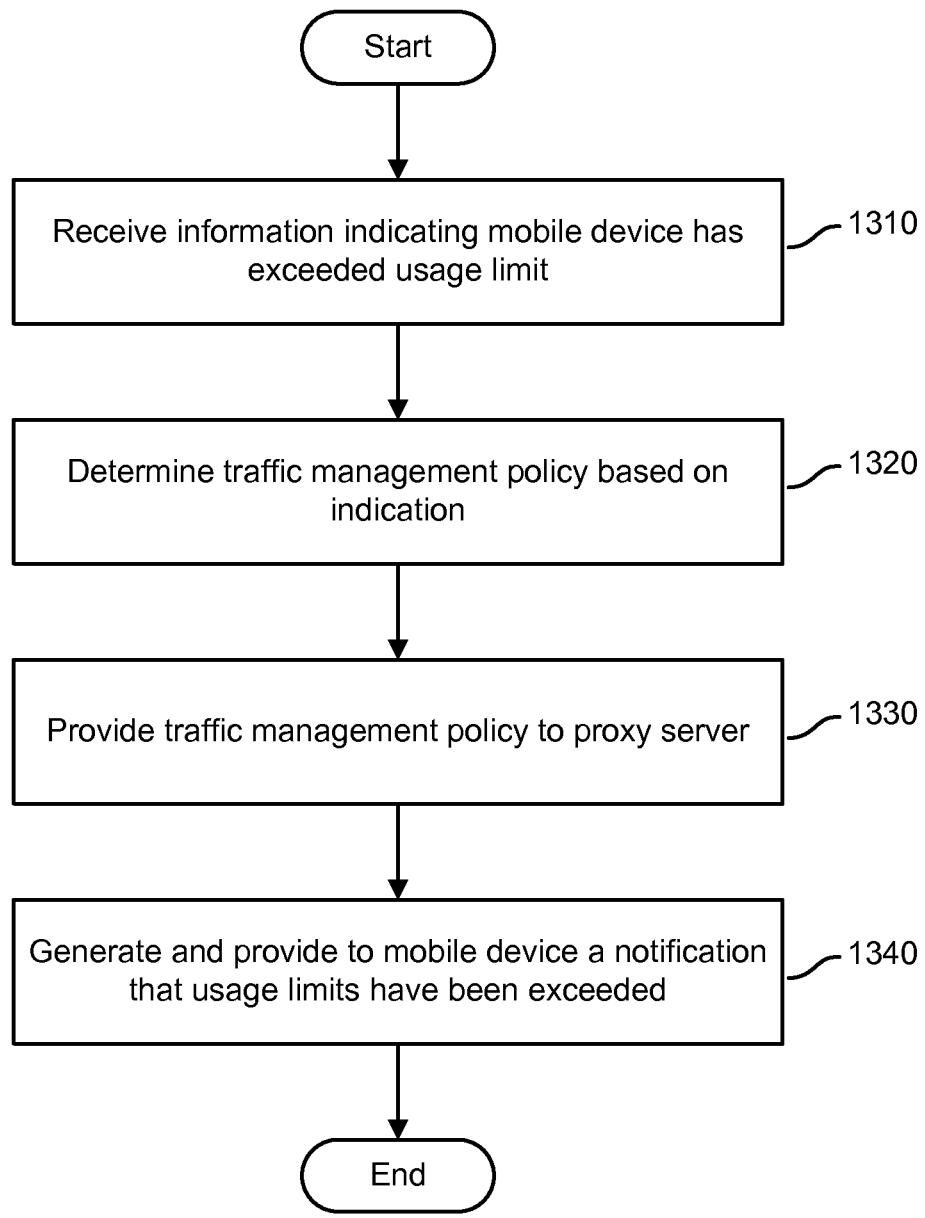
FIG. 13 is a flowchart illustrating embodiments of a process to limit mobile device data usage.

FIG. 13 is a flowchart illustrating embodiments of a process to limit mobile device data usage. In some embodiments, the process of FIG. 13 is performed at a device management server, such as device management server 120 of FIG. 1. In the example shown, information indicating that a mobile device has exceeded a usage limit is received (1310). Information indicating the mobile device has exceeded a usage limit (e.g., usage limit information) may be generated and/or received from a proxy server as discussed above.

A traffic management policy to be applied to the mobile device is determined (1320) based on the indication. In various embodiments, a proxy server evaluates information indicating that the device has exceeded a usage limit. Based on the evaluation, the proxy server may determine that a traffic management policy is to be applied to the device to, for example, limit and/or block data usage. In one example, usage limit information indicates that the mobile device has exceeded an enterprise data usage limit (e.g., 50 MB) but has not yet exceeded a cellular data plan limit of 100 MB for the current month. In this case, a traffic management policy to compress data transferred between the mobile device and nodes is generated. The traffic management policy may, for example, dictate that data transferred between the mobile device and various nodes be compressed using a lossy compression technique to reduce the amount of data transferred over a cellular network. In another example, usage limit information indicates that a mobile device has exceeded a cellular data plan limit of 100 MB for the current month. In this case, a traffic management policy to block data transferred between a mobile device and various nodes is generated. Similar traffic management policies may be generated to limit and/or block cellular phone usage, text message, and/or other data transmission to and/or from a device.

The traffic management policy is provided (1330) to a proxy server. In various embodiments, the device management server provides the traffic management policy to the proxy server. The proxy server may apply the traffic management policy to data transferred between a mobile device and/or or more nodes using the techniques disclosed herein.

A notification that that the mobile device has exceeded a data usage limit is generated and provided (1340) to the mobile device. In various embodiments, a notification indicating that the mobile device has exceed a usage limited is generated and sent to a management agent associated with a mobile device. Based on the received notification, the management agent may generate and output on the mobile device an alert that the mobile device has exceeded a data usage limit. For example, an alert may be output stating that "Your device has exceeded an enterprise data usage limit. To reduce data usage fees, application data will be compressed."

In some embodiments (not shown), configuration information is generated based on the information indicating that the mobile device has exceed a usage limit. The configuration information may be provided to a management agent, platform management engine, and/or other component on the device. Using the techniques disclosed herein, the configuration information may be used to configure a communications component transmit data to a proxy server. The proxy server may be configured to, for example, apply traffic management policies as discussed above.

Figure 14:
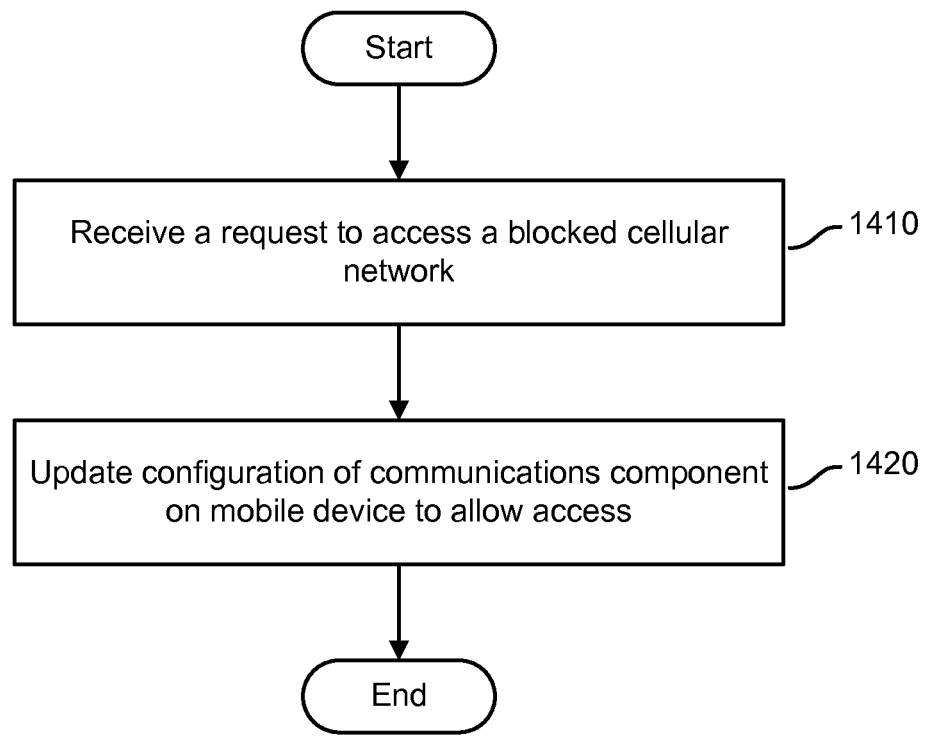
FIG. 14 is a flowchart illustrating embodiments of a process to provide access to a cellular network.

FIG. 14 is a flowchart illustrating embodiments of a process to provide access to a cellular network. In some embodiments, the process of FIG. 14 is implemented at a mobile device, such as mobile device 102 of FIG. 1. A request to access a blocked cellular network is received (1410). In various embodiments, a mobile device is configured to block access to a cellular network using the techniques disclosed herein. For example, a communications component may have been configured based on mobile device configuration information and/or roaming configuration information to block a user from accessing a cellular network The mobile device and/or user may be blocked to reduce cellular network charges. In some embodiments, a user may provide input requesting access to the blocked cellular network. For example, a user may request emergency access to a blocked cellular network to, for example, make a phone call, send an email, and/or perform other operations.

A configuration of a communications component on the device is updated (1420) to allow access. In various embodiments, a management agent on the device may allow a user to change settings associated with the device communications components, such as an APN Proxy, VPN, Wi-Fi, and/or other communications component. The settings and/or configuration of the communications component may be updated to allow the mobile device access to a previously blocked cellular network. In some embodiments, a proxy server may be configured to allow the mobile device temporary access to a blocked cellular network, blocked nodes, and/or other resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, by a proxy server from a device management server, a traffic management policy to be applied to data transferred between a mobile device and a node, wherein the device management server determines the traffic management policy based on a set of information that includes roaming state information received from the mobile device;
    receiving, at the proxy server, data sent from the node to the mobile device;
    in response to the roaming state information indicating the mobile device is in a roaming state, wherein the roaming state indicates the mobile device is connected to a cellular network that is different from a home cellular network of the mobile device:
        determining, based on the traffic management policy, one or more node-specific roaming state processes that are to be applied to the data sent from the node to the mobile device, wherein the one or more node-specific roaming state processes include modifying the data sent from the node to the mobile device; and
    processing, by the proxy server, the data sent from the node to the mobile device based on the traffic management policy, wherein the traffic management policy includes the one or more node-specific roaming state processes to be applied to the data sent from the node to the mobile device; and
    providing, by the proxy server, the processed data to the mobile device based on the traffic management policy.

2. The method of claim 1, wherein the node includes one or more of an enterprise server and a service.

3. The method of claim 1, wherein the roaming state information includes information indicating one or more of a country where the mobile device is located, a current cellular network of the mobile device, and a Wi-Fi service set identification (SSID) associated with the mobile device.

4. The method of claim 1, wherein processing the data includes one or more of compressing the data, filtering the data, blocking the data not processing the data, and securing the data.

5. The method of claim 1, wherein processing the data includes:
    receiving data sent from the node to the mobile device;
    processing the data based on the traffic management policy; and
    providing the processed data to the mobile device.

6. The method of claim 5, further comprising receiving a device identifier associated with the mobile device; and
    using the device identifier to map the traffic management policy to the data sent from the node.

7. The method of claim 1, wherein a platform management engine associated with the mobile device is configured to detect that the mobile device is roaming.

8. The method of claim 1, wherein a platform management engine associated with the mobile device is configured to perform the steps of:
    determining that the mobile device is in the roaming state;
    generating the roaming state information that includes an indication that the device is in the roaming state; and
    providing the roaming state information to the device management server.

9. The method of claim 1, wherein a management agent associated with the mobile device is configured to perform the steps of:
    retrieving information indicating a current cellular network;
    determining that the mobile device is in the roaming state based on a comparison of the current cellular network to information indicating the home cellular network of the mobile device;
    generating the roaming state information that includes an indication that the device is in the roaming state; and
    providing the roaming state information to the device management server.

10. The method of claim 9, wherein the home cellular network is determined based on information included on a Subscriber Identity Module (SIM) card.

11. The method of claim 9, wherein the home cellular network is determined based on information received during registration of the mobile device with the management agent.

12. The method of claim 1, wherein the device management server is configured to perform the steps of:

receiving information indicating a current cellular network;
determining that the mobile device is in the roaming state based on a comparison of the current cellular network to information indicating a home cellular network of the mobile device; and
determining the traffic management policy based on the determination that the mobile device is in the roaming state.

13. The method of claim 1, wherein the device management server is configured to perform the steps of:
generating configuration information based on the roaming state information; and
providing the configuration information to the mobile device.

14. The method of claim 13, wherein a management agent on the mobile device is configured to perform the steps of:
receiving the configuration information; and
using the configuration information to configure a communications component on the mobile device to send data to a proxy server.

15. The method of claim 14, wherein the communications component includes one or more of an access point name (APN) proxy, a virtual private network (VPN) client, and a Wi-Fi client.

16. The method of claim 14, further comprising:
configuring the communications component to process data for transmission to one or more of an APN proxy server, VPN server, and an enterprise service.

17. The method of claim 1, wherein the mobile device is configured to perform the steps of:
determining that the mobile device has transitioned from the roaming state to a non-roaming state;
generating updated roaming state information based on the determination that the mobile device has transitioned from the roaming state to the non-roaming state; and
providing the updated roaming state information to the device management server.

18. The method of claim 17, wherein the device management server is configured to perform the steps of:
receiving the updated roaming state information;
determining based on the updated roaming state information that the traffic management policy is no longer applicable to the mobile device; and
providing an indication to a proxy server that the traffic management policy is to be removed.

19. The method of claim 1, further comprising:
monitoring, at a proxy server, data transferred between one or more nodes and the mobile device;
determining, based on the monitored data, that the mobile device has exceeded a usage limit; and
providing an indication to the device management server.

20. The method of claim 19, wherein the device management server is configured to perform the steps of:
determining a second traffic management policy based on the indication; and
providing the second traffic management policy to the proxy server.

21. The method of claim 20, further comprising:
receiving data sent from the node to the mobile device;
processing the data based on the second traffic management policy; and
providing the processed data to the mobile device.

22. A system, comprising:
a processor; and
a memory coupled with the processor, wherein the memory is configured to provide the processor with instructions which when executed cause the processor to:
receive, from a device management server, a traffic management policy to be applied to data transferred between a mobile device and a node, wherein the device management server determines the traffic management policy based on a set of information that includes roaming state information received from the mobile device;
receive data sent from the node to the mobile device;
in response to the roaming state information indicating the mobile device is in a roaming state, wherein the roaming state indicates the mobile device is connected to a cellular network that is different from a home cellular network of the mobile device:
determine, based on the traffic management policy, one or more node-specific roaming state processes that are to be applied to the data sent from the node to the mobile device, wherein the one or more node-specific roaming state processes include modifying the data sent from the node to the mobile device; and
process the data sent from the node to the mobile device and the node based on the traffic management policy, wherein the traffic management policy includes the one or more node-specific roaming state processes to be applied to the data sent from the node to the; and
provide the processed data to the mobile device based on the traffic management policy.

23. A computer program product, the computer program product being embodied in a tangible non-transitory computer readable storage medium and comprising computer instructions for:
receiving, by a proxy server from a device management server, a traffic management policy to be applied to data transferred between a mobile device and a node, wherein the device management server determines the traffic management policy based on a set of information that includes roaming state information received from the mobile device;
receiving, at the proxy server, data sent from the node to the mobile device;
in response to the roaming state information indicating the mobile device is in a roaming state, wherein the roaming state indicates the mobile device is connected to a cellular network that is different from a home cellular network of the mobile device:
determining, based on the traffic management policy, one or more node-specific roaming state processes that are to be applied to the data sent from the node to the mobile device, wherein the one or more node-specific roaming state processes include modifying the data sent from the node to the mobile device; and
processing by the proxy server the data sent from the node to the mobile device based on the traffic management policy, wherein the traffic management policy includes one or more node-specific roaming state processes to be applied to the data sent from the node to the mobile device; and providing, by the proxy server, the processed data to the mobile device based on the traffic management policy.

\* \* \* \* \*